United States Patent [19]
Campbell et al.

[11] 3,839,295
[45] Oct. 1, 1974

[54] PRODUCTION OF POLYAMIDES FROM AQUEOUS SLURRY OF 5-METHYL-1,9-NONANEDIAMINE AND TEREPHTHALIC ACID

[75] Inventors: Robert W. Campbell; H. Wayne Hill, Jr., both of Bartlesville, Okla.

[73] Assignee: Phillips Petroleum Company, Bartlesville, Okla.

[22] Filed: May 22, 1972

[21] Appl. No.: 255,774

Related U.S. Application Data

[63] Continuation-in-part of Ser. No. 234,031, March 13, 1972.

[52] U.S. Cl. .............................. 260/78 R, 260/78 S
[51] Int. Cl. ............................................. C08g 20/20
[58] Field of Search .................................. 260/78 R

[56] References Cited
UNITED STATES PATENTS

| | | | |
|---|---|---|---|
| 2,752,328 | 6/1956 | Magat | 260/78 R |
| 3,145,193 | 8/1964 | Gabler | 260/78 R |
| 3,150,113 | 9/1964 | Gabler | 260/78 R |
| 3,150,117 | 9/1964 | Gabler | 260/78 R |
| 3,294,758 | 12/1966 | Gabler | 260/78 R |
| 3,544,526 | 12/1970 | Kirkaldy | 260/78 R |
| 3,575,935 | 4/1971 | Elam | 260/78 R |

*Primary Examiner*—Harold D. Anderson

[57] ABSTRACT

Terephthalic acid and either 5-methyl-1,9-nonanediamine or an isomeric mixture of 5-methyl-1,9-nonanediamine with 2,4-dimethyl-1,8-octanediamine and/or 2,4,6-trimethyl-1,7-heptanediamine are added to water to form a slurry, the amount of water being less than 25 weight percent of the slurry, and the slurry is heated under polymerization conditions to form a polyamide without the isolation of the salt or the concentration of the slurry.

10 Claims, No Drawings

PRODUCTION OF POLYAMIDES FROM AQUEOUS SLURRY OF 5-METHYL-1,9-NONANEDIAMINE AND TEREPHTHALIC ACID

This invention is a continuation-in-part of copending application Ser. No. 234,031, filed Mar. 13, 1972.

This invention relates to a process for the production of polyamides. In a specific aspect, the invention relates to a process for forming a polyamide from terephthalic acid and 5-methyl-1,9-nonanediamine. In another aspect the invention relates to the formation of a salt of 5-methyl-1,9-nonanediamine and terephthalic acid and the polycondensation of the salt without isolation of the salt.

It has been customary in the art of producing polyamides to form the salt in solution, such as a solution of 25 to 55 weight percent of reactants in water, and then to either concentrate the solution by the evaporation of solvent or to add a reagent to precipitate the salt. The latter procedure involves the cost of the reagent as well as the cost of the filtration equipment and generally the step of reintroducing the purified salt into a solvent in the polycondensation reactor. The concentration of the solution by evaporation of the solvent encounters significant loss of reactants by volatilization and variation from the desired ratio of diacid to diamine. This problem is particularly acute with terephthalic acid which is so high melting (m.p. > 300°C) that, in the absence of water other than that produced in the polymerization, an equal molar mixture of terephthalic acid and 5-methyl-1,9-nonanediamine has to be heated to at least about 270°C before all of the terephthalic acid is consumed. A significant amount of unreacted diamine is lost before the 270°C temperature is reached. On the other hand, if sufficient water is added to obtain a salt solution at room temperature, the molecular weight of the polyamide is undesirably low. Although it has been suggested that the dilute salt solution be added directly to the polycondensation reactor, the heat required to raise the dilute solution to the polymerization temperature is excessive, problems are encountered with the very large amounts of water vapor in the reactor, and inferior polymer is produced.

In accordance with the present invention, it has been discovered that these disadvantages of the prior art can be avoided with respect to the production of a polyamide from terephthalic acid and 5-methyl-1,9-nonanediamine, a mixture of 5-methyl-1,9-nonanediamine and isomer(s) thereof, by combining the diacid and the diamine in a liquid consisting of water to form a slurry, the amount of the water in the slurry being less than 25 weight percent of the slurry. The slurry can then be heated to polycondensation conditions without either a recovery of the salt or a concentration of the aqueous mixture.

Accordingly, it is an object of the present invention to provide a new and improved process for the formation of a polyamide. It is an object of the invention to eliminate the need for concentration of a salt solution and/or the recovery of the salt from the solution. It is an object of the invention to provide a process for producing improved polyamides. Other objects, aspects and advantages of the invention will be apparent from a study of the specification and the appended claims to the invention.

The polymers of the present invention are linear terephthalamide polymers composed at least primarily of recurring structural units of the formula

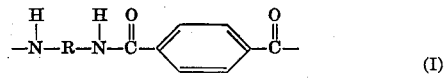

wherein R is selected from the group consisting of 5-methylnonamethylene, 2,4-dimethyloctamethylene, and 2,4,6-trimethylheptamethylene, with at least 50 percent, preferably at least 70 percent, and more preferably at least 80 percent of the R's being 5-methylnonamethylene. Linear as used herein is meant to refer to polymer which is fusible and soluble in common solvents for polyamides, e.g., m-cresol, formic acid, etc. Polymers consisting of recurring units derived from pure 5-methyl-1,9-nonanediammonium terephthalate have been found to have useful properties. Although it is within the contemplation of the invention for the polymer to contain up to 20 weight percent of other recurring structural units, the polymer will generally have at least 90 weight percent, preferably at least 95 weight percent, and more preferably at least 98 weight percent, of its recurring structural units in the form of the $C_{10}$ diamine terephthalamide define by formula I. Linear polymers consisting essentially of the $C_{10}$ diamine terephthalamide defined by formula I as the sole recurring unit have been found to be particularly useful. When other recurring units are present in the polymer as a result of monomeric impurities being present in the preparation of the salt, such other recurring units will generally have the formula

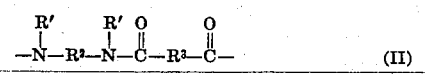

wherein each R' is independently selected from the group consisting of hydrogen and alkyl radicals having from 1 to 4 carbon atoms per radical, $R^2$ is a divalent hydrocarbon radical having from 6 to 16 carbon atoms, and $R^3$ is a divalent hydrocarbon radical having from 4 to 14 carbon atoms. For example, in the preparation of the saturated $C_{10}$ diamines having from 7 to 9 carbon atoms in the chain by the reaction of acrylonitrile and isobutylene and the subsequent hydrogenation of the reaction product, incomplete hydrogenation will permit the diamine product to contain olefinic materials such as 5-methyl-4-nonenediamine, 2,4-dimethyl-4-octenediamine, 2,4-dimethyl-3-octenediamine, and 2,4,6-trimethyl-3-heptenediamine. Such olefinic materials being present during the polycondensation reaction results in a polyamide having olefinic double bonds. The presence of such olefinic double bonds in the polyamide is desirably minimized, at least to the extent of having less than 5 olefinic double bonds per 100 R groups in the polyamide. In preferred embodiments of the polymer, the polyamide will contain less than about 1 olefinic double bond per 100 R groups and more preferably less than about 1 olefinic double bond per 1000 R groups.

The recurring units of formula II can also be present as a result of deliberate addition of other diamines, dicarboxylic acids, or salts for the purpose of producing a copolymer. Thus diamines such as hexamethylenediamine, octamethylenediamine, nonamethylenediamine, decamethylenediamine, hexamethylenediamine, 1,4-cyclohexanediamine, 1,4-bis(aminomethyl)cyclohexane, bis(4-aminocyclohexyl)methane, or alkyl substituted versions thereof, can be employed along with various dicarboxylic acids such as adipic acid, suberic acid, azelaic acid, sebacic acid, dodecanedioic acid, hexadecanedioic acid, 1,4-cyclohexanedicarboxylic acid, or 1,1,3-trimethyl-5-carboxy-3-(p-carboxyphenyl)indane. In lieu of, or in addition to, polymer units as represented in formula II, recurring units such as those obtained by polymerization of amino acids and/or lactams can be present. The end groups on the polymer can be varied as desired by employing various amounts of excess acid or excess diamine, or by adding known additives such as monofunctional acids.

The presently preferred polyamides of terephthalic acid and either 5-methyl-1,9-nonanediamine or an admixture of 5-methyl-1,9-nonanediamine with 2,4-dimethyl-1,8-octanediamine and/or 2,4,6-trimethyl-1,7-heptanediamine have an inherent viscosity (as measured at 30°C in a $m$-cresol solution having a polymer concentration of 0.5 gram/100 milliliters solution) of at least 0.6, more preferably at least 0.65 and for fiber applications most preferably in the range of about 0.7 to about 1.2. These presently preferred polyamides will also generally have a polymer melt temperature (PMT) of at least about 200°C, preferably in the range of about 225°C to about 260°C, a glass transition temperature ($T_g$) of at least 100°C, preferably in the range of about 100°C to about 120°C and more preferably in the range of about 105°C to about 115°C, a crystalline melting point ($T_m$) of at least 247°C, preferably in the range of about 247°C to about 265°C and more preferably in the range of about 250°C to about 260°C. These polyamides have been found to have infrared absorption bands near 3300, 3080, 2930, 2880, 1630, 1550, 1500, 1300, 1020, 870, and 740 cm$^{-1}$. The polymers can be produced in the absence of any plasticizers, and as employed for fibers, will generally have less than 2 weight percent, preferably less than 0.5 weight percent, based on the weight of the fiber, of any plasticizers for the polymer. Such polymers which are at least essentially free of any plasticizers for the polymer have been found to be particularly useful for fibers as the presence of plasticizers generally lowers $T_g$, reduces crystallinity, and increases the boiling water shrinkage of the fiber. However, if desired, a plasticizer can be incorporated into the polymer and/or fiber by suitable techniques.

These polyamides are formed in accordance with the present invention by the addition of the diamine and other desired component(s) to a liquid consisting of water to form a slurry, the amount of the water in the slurry being less than 25 weight percent. In order to achieve satisfactory homogeneity and mobility of reactants and desirable molecular weight of polymer product, the amount of water in the slurry will be at least 5 weight percent, and preferably at least 10 weight percent of the slurry, and most preferably being about 20 weight percent, of the slurry. The slurry is then heated to polycondensation conditions without any significant concentration of the slurry. In a presently preferred embodiment, the diacid and the diamine in at least substantially equimolar amounts are admixed with the water in the polycondensation reactor. The reactor can be purged and then heated under autogeneous pressure to a suitable temperature, preferably less than about 310°C, and more preferably less than about 300°C. In a particularly preferred embodiment, the temperature can be raised to a value in the range of about 200°C to about 230°C and then be held at least substantially constant at that value for a time in the range of about one-half hour to about 6 hours before resuming the increasing of the temperature to the desired final value. The temperature can be held at the desired final value for a period of time, generally in the range of about one-fourth hour to about 16 hours before venting the reactor. The temperature can be maintained at the desired final value during venting to atmospheric pressure, purging with nitrogen, and subsequently reducing the pressure to a subatmospheric value, at which point the temperature and pressure will generally be maintained at least substantially constant for a period of time in the range of about one-fourth hour to about 16 hours.

The polyamides of the invention can be employed as molding resins, but have been found to be of particular interest in the formation of fibers. Utilizing these polyamides, fibers having a boiling water shrinkage of less than 30 percent and a zero strength temperature of at least 200°C are readily produced. The presently preferred fiber of these polyamides have a boiling water shrinkage of less than 20 percent, a zero strength temperature of at least 210°C, more preferably at least 215°C, and a tenacity of at least 2 grams per denier, and more preferably at least 3.5 grams per denier. The fibers are preferably drawn to a length at least 3 times, and more preferably at least 3.5 times, the original quenched length, to achieve desirable characteristics. If desired, the drawn fiber can be annealed to further reduce the boiling water shrinkage.

The following examples are presented in further illustration of the invention, but should not be construed in undue limitation thereof. Examples IV and V were conducted in accordance with the process of this invention, resulting in polymer having properties, including a sufficiently high molecular weight as evidenced by inherent viscosity, desirable in a resin of molding or fiber quality. Examples I, II and III represent processes outside the scope of this invention in which the polymer produced was of lower quality as indicated, e.g., by its lower molecular weight as evidenced by its undesirably low inherent viscosity. In each of the examples, when shown, inherent viscosity, PMT, $T_g$, and $T_m$ were determined as described on pages 41–50 of Sorenson and Campbell, "Preparative Methods of Polymer Chemistry," Interscience Publishers, Inc., New York (1961), with the values for $T_g$ and $T_m$ being determined by differential thermal analysis of samples which had been premelted at 290°C and quenched. In these determinations of $T_g$ and $T_m$ the heating rates of the quenched samples was 10°C per minute, the determinations being made in an inert atmosphere. Inherent viscosity was measured at 30°C in a $m$-cresol solution having a polymer concentration of 0.5 gram/100 milliliters solution. MND as used herein refers to predominantly 5-methyl-1,9-nonanediamine containing one or more isomeric $C_{10}$ diamines and a small amount of impurity.

EXAMPLE I

In a glass reaction vessel was placed 3.3222 grams (20 mmoles) of terephthalic acid (TPA) and 3.4466 grams (20 mmoles) of MND (88.0 weight percent 5-methyl-1,9-nonanediamine, 11.3 weight percent 2,4- dimethyl-1,8-octanediamine, 0.5 weight percent N-methylated $C_{10}$ diamines, and 0.2 weight percent unidentified substances). Air was removed by alternately flushing with 10 psig nitrogen and evacuating three times. It was closed off under 10 psig nitrogen and heated in the following manner:

| Time, mins. | Temp., °C. | Comments |
| --- | --- | --- |
| 30 | ~25–210 | heated at an at least substantially uniform rate |
| 180 | 210 | temperature maintained at least substantially constant |
| 30 | 210–290 | heated at an at least substantially uniform rate |
| 30 | 290 | temperature maintained at least substantially constant, maximum pressure registered was 20 psig |
| 60 | 290 | vented to atmospheric pressure followed by slow nitrogen flush |
| 60 | 290 | pressure slowly reduced to 20 mm Hg |

The product was cooled to room temperature under nitrogen and the glass was removed. The polymer had an inherent viscosity of 0.51 in $m$-cresol, and a polymer melt temperature (PMT) of 225°C.

EXAMPLE II

To an unstirred 1-liter autoclave was charged a solution of 50.58 grams (0.3045 mole) of TPA and 51.69 grams (0.3000 mole) of the MND of Example I in 103 milliliters of deionized water. Air was removed and the system was closed off under 60 psig nitrogen and heated in the following manner:

| Time, mins. | Temp., °C. | Comments |
| --- | --- | --- |
| 30 | ~25–210 | heated at an at least substantially uniform rate |
| 135 | 210 | temperature maintained at least substantially constant |
| 45 | 210–290 | heated at an at least substantially uniform rate |
| 30 | 290 | temperature maintained at least substantially constant, maintained 200–220 psig by venting as necessary |
| 30 | 290 | vented slowly to atmospheric pressure |
| 30 | 290 | nitrogen flush |
| 15 | 290 | pressure slowly reduced to 20 mm Hg |
| 30 | 290 | 20 mm Hg pressure |

The plug was removed from the bottom of the reactor and the molten polymer was extruded into an aqueous bath using nitrogen pressure. The polymer had an inherent viscosity of 0.60 in $m$-cresol and a PMT of 235°C.

EXAMPLE III

To an unstirred 1-liter autoclave was charged 49.83 grams (0.300 mole) of TPA, 52.21 grams (0.303 mole) of MND (91.5 weight percent 5-methyl-1,9-nonanediamine, 7.5 weight percent 2,4-dimethyl-1,8-octanediamine, and 1.0 weight percent N-methylated $C_{10}$ diamines) and 102 milliliters of deionized water. Air was removed by alternately flushing with 60 psig nitrogen and evacuating three times. The system was closed off under 60 psig nitrogen and heated in the following manner:

| Time, mins. | Temp., °C. | Comments |
| --- | --- | --- |
| 30 | ~25–210 | heated at an at least substantially uniform rate |
| 170 | 210 | temperature maintained at least substantially constant |
| 30 | 210–280 | heated at an at least substantially uniform rate |
| 30 | 280 | temperature maintained at least substantially constant, maximum pressure registered was 500 psig |
| 30 | 280 | vented slowly to atmospheric pressure |
| 30 | 280 | nitrogen flush |
| 15 | 280 | pressure slowly reduced to 20 mm Hg |
| 45 | 280 | 20 mm Hg pressure |

The plug was removed from the bottom of the reactor and the molten polymer was extruded using nitrogen pressure. This polymer had an inherent viscosity of 0.58 in $m$-cresol, and a PMT of 230°C.

EXAMPLE IV

To an unstirred 1-liter autoclave were charged 83.88 grams (0.505 mole) of TPA, 86.15 grams (0.500 mole) of MND (87.3 weight percent 5-methyl-1,9-nonanediamine, 11.5 weight percent 2,4-dimethyl-1,8-octanediamine, 0.1 weight percent 2,4,6-trimethyl-1,7-heptanediamine, and 1.2 weight percent N-methylated $C_{10}$ diamines), and 42 milliliters of distilled water. Air was removed by alternately flushing with 60 psig nitrogen and evacuating three times. The system was closed off under 60 psig nitrogen and heated in the following manner:

| Time, mins. | Temp., °C. | Comments |
| --- | --- | --- |
| 30 | ~25–210 | heated at an at least substantially uniform rate |
| 150 | 210 | temperature maintained at least substantially constant |
| 30 | 210–290 | heated at an at least substantially uniform rate |
| 30 | 290 | temperature maintained at least substantially constant, maximum pressure registered was 450 psig |
| 30 | 290 | vented slowly to atmospheric pressure |
| 30 | 290 | nitrogen flush |
| 30 | 290 | pressure reduced to 20 mm Hg |

During the 30-minute venting period and the 30-minute nitrogen flushing period, 56 milliliters of water were removed from the reactor. The plug was removed from the bottom of the reactor and the molten polymer was extruded. The quenched strands were very tough. The remainder of the polymer was removed after cooling to about 25°C under nitrogen. The polymer product had an inherent viscosity of 0.96 in $m$-cresol, a PMT of 230°C, a crystalline melting point ($T_m$) of 251°C, and a glass transition temperature ($T_g$) of 111°C. A sample of the polymer was compression molded at 540°C and quenched, giving molded objects having the following mechanical properties:

| | |
| --- | --- |
| Tensile strength, psi[a] | 10290 |
| Elongation, %[a] | 98 |
| Flexural modulus, psi × $10^{-3}$ [b] | 274 |
| Izod Impact Strength, ft-lb/in notch[c] | 2.19 |
| Heat deflection temperature, 264 psi, °F[d] | 224 |
| Shore D hardness[e] | 83 |

[a] ASTM D 638-68

[b] ASTM D 790-66
[c] ASTM D 256-66
[d] ASTM D 648-56
[e] ASTM D 1706-61, Shore durometer, type D

EXAMPLE V

To an unstirred 1-liter autoclave were charged 51.69 grams (0.300 mole) of the MND of Example IV, 50.48 grams (0.3039 mole) of terephthalic acid, and 25.5 grams of distilled water. Air was removed from the autoclave by alternately flushing with 60 psig nitrogen and evacuating three times. The system was closed off under 60 psig nitrogen and then heated in the following manner:

| Time, mins. | Temp., °C. | Comments |
|---|---|---|
| 30 | ~25–210 | heated at an at least substantially uniform rate |
| 150 | 210 | temperature maintained at least substantially constant |
| 30 | 210–290 | heated at an at least substantially uniform rate |
| 30 | 290 | maximum pressure registered was 260 psig |
| 30 | 290 | vented slowly to atmospheric pressure |
| 30 | 290 | slow nitrogen flush |
| 15 | 290 | pressure slowly reduced to 20 mm Hg |
| 30 | 290 | 20 mm Hg pressure |

The outlet plug was removed from the bottom of the reactor, and most of the molten polymer was extruded using nitrogen pressure into an aqueous bath containing dry ice. The polymer remaining in the autoclave was cooled to about 25°C under nitrogen and then chipped out. The combined polymer product was chopped in a Wiley mill. The resulting polymer product had an inherent viscosity of 0.73 in m-cresol, a PMT of 230°C, a $T_g$ of 107°C, and a $T_m$ of 251°C. The polymer was melt spun (270°C) and drawn (5X at 150°C) into fibers having a tenacity of 5.5 gpd, an elongation of 15 percent, and an initial modulus of 41 gpd (ASTM D 2256-69, using an optional rate of elongation of 100 percent per minute), demonstrating utility of the polymer as a fiber.

Reasonable variations and modifications are possible within the scope of the foregoing disclosure and the appended claims to the invention.

We claim:

1. A process for the formation of a terephthalamide polymer suitable for use as a molding resin with at least 80 weight percent of the polymer being composed of recurring structural units of the formula

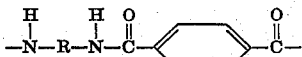

wherein R is selected from the group consisting of 5-methylnonamethylene, 2,4-dimethyloctamethylene, and 2,4,6-trimethylheptamethylene, with at least 50 percent of the R's being 5-methylnonamethylene, which comprises admixing terephthalic acid, at least one diamine having the formula $H_2N$—R—$NH_2$, wherein R is as previously defined, and a liquid consisting of water to form a slurry, the amount of water in said slurry at the time of admixing being at least 5 weight percent and less than 25 weight percent of said slurry, and then heating said slurry under polycondensation conditions to produce said polymer without any significant concentration of said slurry prior to being subjected to said polycondensation conditions.

2. A process in accordance with claim 1 wherein said amount of water in said slurry is about 20 weight percent of said slurry.

3. A process in accordance with claim 1 wherein said polymer has an inherent viscosity of at least about 0.6 as measured at 30°C in a m-cresol solution having a polymer concentration of 0.5 gram/100 milliliters solution; and wherein said polymer has a polymer melt temperature of at least about 220°C, a $T_g$ in the range of about 100°C to about 120°C, and a $T_m$ in the range of about 247°C to about 265°C.

4. A process in accordance with claim 1 wherein the terephthalic acid, diamine and water are admixed in a polycondensation reactor to form said slurry and the said slurry is heated in said reactor under polycondensation conditions to form said polymer without any significant concentration of said slurry prior to being subjected to said polycondensation conditions.

5. A process in accordance with claim 1 wherein said amount of water in said slurry is in the range of about 10 to about 20 weight percent of said slurry.

6. A process in accordance with claim 1 wherein at least 80 percent of the R's are 5-methylnonamethylene.

7. A process in accordance with claim 1 wherein said polymer consists essentially of said recurring structural units.

8. A process in accordance with claim 7 wherein said amount of water in said slurry is in the range of about 10 to about 20 weight percent of said slurry.

9. A process in accordance with claim 8 wherein at least 80 percent of the R's are 5-methylnonamethylene.

10. A process in accordance with claim 9 wherein the terephthalic acid, diamine and water are admixed in a polycondensation reactor to form said slurry and the said slurry is heated in said reactor under polycondensation conditions to form said polymer without any significant concentration of said slurry prior to being subjected to said polycondensation conditions.

* * * * *